United States Patent
Shelke et al.

(10) Patent No.: US 10,599,532 B2
(45) Date of Patent: Mar. 24, 2020

(54) UPGRADE BACKUP IN VIRTUALIZED COMPUTING ENVIRONMENTS

(71) Applicant: NICIRA, INC., Palo Alto, CA (US)

(72) Inventors: Prashant Shelke, Pune (IN); Sharwari Phadnis, Pune (IN); Yogesh Vhora, Pune (IN); Kartiki Kale, Pune (IN); Neha Pratik Dhakate, Pune (IN); Ganesh Avachare, Pune (IN); Mohammad Siddiqui, Pune (IN)

(73) Assignee: NICIRA, INC., Palo Alto, CA (US)

( * ) Notice: Subject to any disclaimer, the term of this patent is extended or adjusted under 35 U.S.C. 154(b) by 190 days.

(21) Appl. No.: 15/915,086

(22) Filed: Mar. 8, 2018

(65) Prior Publication Data

US 2019/0227882 A1 Jul. 25, 2019

(30) Foreign Application Priority Data

Jan. 24, 2018 (IN) .............................. 201841002902

(51) Int. Cl.
| | |
|---|---|
| *G06F 11/14* | (2006.01) |
| *G06F 8/65* | (2018.01) |
| *G06F 16/23* | (2019.01) |
| *G06F 16/93* | (2019.01) |

(52) U.S. Cl.
CPC ............ *G06F 11/1469* (2013.01); *G06F 8/65* (2013.01); *G06F 11/1433* (2013.01); *G06F 11/1451* (2013.01); *G06F 16/2365* (2019.01); *G06F 16/93* (2019.01); *G06F 2201/84* (2013.01)

(58) Field of Classification Search
CPC .... G06F 11/1469; G06F 8/65; G06F 9/45545; G06F 11/1441; G06F 16/182
See application file for complete search history.

(56) References Cited

U.S. PATENT DOCUMENTS

| | | | | |
|---|---|---|---|---|
| 2009/0205040 | A1* | 8/2009 | Zunke | G06F 8/65 726/14 |
| 2010/0250832 | A1* | 9/2010 | Zhang | G06F 11/1441 711/103 |
| 2016/0371105 | A1* | 12/2016 | Sieffert | G06F 9/45545 |
| 2018/0025025 | A1* | 1/2018 | Davis | G06F 16/182 707/827 |

\* cited by examiner

*Primary Examiner* — Etienne P Leroux
(74) *Attorney, Agent, or Firm* — Su IP Consulting

(57) ABSTRACT

Example methods and systems to validate integrity of data and one or more configurations in response to an upgrade in a virtualized computing environment are disclosed. One method may include preparing a first pre-upgrade backup file and a first post-upgrade backup file in response to a data plane upgrade of the virtualized computing environment and validating the integrity of data and one or more configurations based on the first pre-upgrade backup file and the first post-upgrade backup file before upgrading a control plane of the virtualized computing environment.

21 Claims, 3 Drawing Sheets

UPGRADE BACKUP IN VIRTUALIZED COMPUTING ENVIRONMENTS

RELATED APPLICATIONS

Benefit is claimed under 35 U.S.C. 119(a)-(d) to Foreign Application Serial No. 201841002902 filed in India entitled "UPGRADE BACKUP IN VIRTUALIZED COMPUTING ENVIRONMENTS", on Jan. 24, 2018, by Nicira, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual appliances in a virtualized computing environment. For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software defined networking, benefits similar to server virtualization may be derived for networking services. For example, logical overlay networks may include various components and be provided that are decoupled from the underlying physical network infrastructure, and therefore may be provisioned, changed, stored, deleted and restored programmatically without having to reconfigure the underlying physical hardware. In a logical overlay network with hundreds or thousands of components, it can be challenging to effectively validate the integrity of data and configurations of the components after upgrading, which may in turn result in operational difficulties and/or increased security risks.

DETAILED DESCRIPTION

Figure 1:
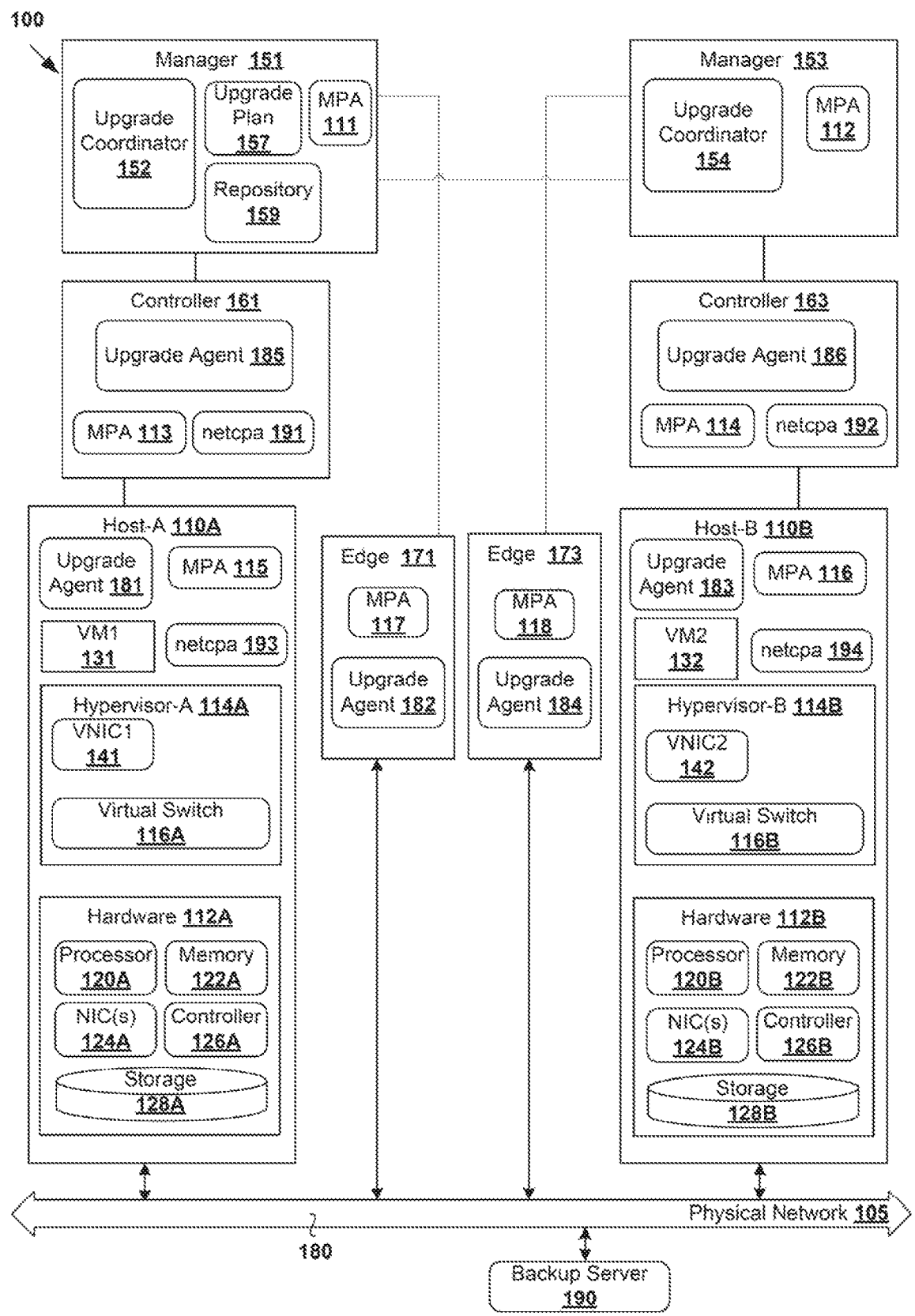
FIG. 1 is a schematic diagram illustrating an example virtualized computing environment in which a distributed upgrade may be implemented.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example virtualized computing environment 100 in which a distributed upgrade may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A and host-B 110B that are connected via physical network 105. Each host 110A/110B includes suitable hardware 112A/112B and virtualization software (e.g., hypervisor-A 114A and hypervisor-B 114B) to support virtual machines (e.g., VM1 131 and VM2 132). For example, host-A 110A supports VM1 131; and host-B 110B supports VM2 132. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B maintains a mapping between underlying hardware 112A/112B and virtual resources allocated to respective virtual machines 131-132. Hardware 112A/112B includes suitable physical components, such as central processing unit(s) or processor(s) 120A/120B; memory 122A/122B; physical network interface controllers 124A/124B; and storage disk(s) 128A/128B accessible via storage controller(s) 126A/126B, etc. To support guest operating systems and applications, virtual resources are allocated to the virtual machines. For example, corresponding to hardware 112A/112B, the virtual resources may include virtual CPU, virtual memory, virtual disk, virtual network interface controller (VNIC), etc. In the example in FIG. 1, VM1 131 and VM2 132 are associated with respective VNIC1 141 and VNIC2 142. Although one-to-one relationships are shown, one virtual machine may be associated with multiple VNICs (each VNIC having its own network address) in practice.

Hypervisor 114A/114B implements virtual switch 116A/116B to forward egress packets (i.e., outgoing or outbound)

from, and ingress packets (i.e., incoming or inbound) to, the virtual machines. As used herein, the term "packet" may refer generally to a group of bits that can be transported together from a source to a destination, such as segment, frame, message, datagram, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 105 may include any suitable number of interconnected physical network devices, such as routers, switches, etc.

Managers 151, 153, controllers 161, 163 and edges 171, 173 are components that facilitate implementation of software defined (e.g., logical overlay) networks in virtualized computing environment 100. Through network virtualization, logical overlay networks may be provisioned, changed, stored, deleted and restored programmatically without having to reconfigure the underlying physical hardware. A logical overlay network may be formed using any suitable protocol, such as Virtual Local Area Network (VLAN), Virtual eXtensible Local Area Network (VXLAN), Stateless Transport Tunneling (STT), Generic Network Virtualization Encapsulation (GENEVE), etc.

In some embodiments, an example logical overlay network may be implemented with an architecture having been built-in separation of a management plane, a control plane, and a data plane. The management plane provides secure concurrent entry points to the example logical overlay network via a graphical user interface. The control plane is configured to track of the real-time virtual networking and security state of the logical overlay network. The data plane implements a number of capability to improve the performance and resiliency of the example logical overlay network. In some embodiments, the management plane includes managers 151 and 153, the control plane includes controllers 161 and 163 and the data plane includes hosts 110A and 110B and edges 171 and 173.

Managers 151 and 153 may be members of a management cluster (not shown for simplicity) and serve as an entry point for Representational State Transfer (REST) Application Programming Interface (API) for NSX, which facilitates automate deployment and management of components in the example logical overlay network. Some example components in the example logical overlay network include, but not limited to, controllers 161 and 163, edges 171 and 173 and hosts 110A and 110B. One example of managers 151 and 153 is the NSX manager component of VMware NSX® (available from VMware, Inc.) that operates on a management plane. Managers 151/153 may be implemented using physical machine(s), virtual machine(s), or both. Managers 151 and 153 may run management plane agent (MPA) 111 and 112, respectively. MPA 111 and 112 are configured to persist the state of virtualized computing environment 100 and communicate non-flow-controlling messages such as configurations, statistics, status and real time data among MPA 113 and 114 on controller 161 and 163, MPA 115 and 116 on hosts 110A and 110B, and MPA 117 and 118 on edges 171 and 173.

Controllers 161 and 163 may be members of a controller cluster (not shown for simplicity) that is configurable using managers 151 and 153, respectively. One example of controllers 161 and 163 is the NSX controller component of VMware NSX® that operates on a central control plane. Controllers 161/163 may be implemented using physical machine(s), virtual machine(s), or both. Controllers 161 and 163 may run control plane agent (netcpa) 191 and 192 to monitor the communications between controllers 161/163 and hosts 110A/110B. Similarly, hosts 110A and 110B also run netcpa 193 and 194 to validate the connections from hosts 110A/110B to controllers 161/163.

Edges 171 and 173 are configured to provide network edge security and gateway services in the example logical overlay network. One example of edge 171 and 173 is the NSX Edge component of VMware NSX® that operates on a data plane. In some embodiments, edges 171 and 173 may provide logical services in the example logical overlay network. Some example logical services include, but not limited to, routing, network address translation, firewall, load balancing, L2 and L3 virtual private networks, and dynamic host configuration protocol (DHCP), domain name system (DNS) and internet protocol (IP) address managements.

Components (managers 151/153, controllers 161/163, edges 171/173 and hosts 110A/110B) in the logical overlay network may be upgraded. During the upgrade, an administrator may upload an upgrade bundle to manager 151 and trigger and monitor the upgrade progress of hosts 110A/110B, edges 171/173, controllers 161/163 and managers 151/153. In some embodiments, upgrade coordinator 152 of manager 151 is used for the upgrades of all components in virtualized computing environment 100.

In some embodiments, manager 151 is configured to upgrade hosts 110A/110B, edges 171/173, controllers 161/163 and managers 151/153. In some embodiments, manager 151 includes repository 159 to which an upgrade bundle is uploaded to manager 151. Other manager (e.g., manager 153) in the example overlay logical network may be coordinated by manager 151.

In some embodiments, manager 151 runs upgrade coordinator 152 which is a self-contained Web application that orchestrates the upgrade process of different components in the example overlay logical network. In some embodiments, master manager 151 is configured to get a list of all components in virtualized computing environment 100. Based on the list, upgrade coordinator 152 is configured to generate upgrade plan 157 for all components (e.g., manager 151/153, controller 161/163, edge 171/173 and host 110A/110B). In some embodiments, upgrade plan 157 lists out the tasks and the orders to carry out the tasks.

More specifically, according to upgrade plan 157, upgrade coordinator 152 is configured to orchestrate the tasks and the orders to carry out the tasks associated with the upgrades of hosts 110A/110B to upgrade hosts 110A/110B. In some embodiments, upgrade coordinator 152 is configured to prepare backup files and store the backup files to backup server 190 before and after upgrading hosts 110A/110B. After hosts 110A/110B are upgraded, upgrade coordinator 152 is configured to orchestrate the tasks and the orders to carry out the tasks associated with the upgrades of edges 171/173 to upgrade edges 171/173. In some embodiments, upgrade coordinator 152 is configured to prepare backup files and store the backup files to backup server 190 before and after upgrading edges 171/173.

Similarly, after edges 171/173 are upgraded, upgrade coordinator 152 is configured to orchestrate the tasks and the orders to carry out the tasks associated with the upgrades of controllers 161/163 to upgrade controllers 161/163. In some embodiments, upgrade coordinator 152 is configured to prepare backup files and store the backup files to backup server 190 before and after upgrading controllers 161/163. Finally, after controllers 161/163 are upgraded, upgrade coordinator 152 is configured to orchestrate the tasks and the orders to carry out the tasks associated with the upgrades of managers 151/153 to upgrade managers 151/153. In some embodiments, upgrade coordinator 152 is configured to prepare backup files and store the backup files to backup server 190 before and after upgrading managers 151/153.

In some embodiments, upgrade coordinator 152 is configured to work with upgrade agents 181/183 to upgrade hosts 110A/110B, upgrade agents 182/184 to upgrade edges 171/173 and upgrade agents 185/186 to upgrade controllers 161/163. In some embodiments, upgrade agents 181-186 are configured to receive commands from upgrade coordinator 152 to download the upgrade bundle from repository 159, process the upgrade bundle and upgrade hosts 110A/110B, edges 171/173 and controllers 161/163 according to the upgrade bundle.

Figure 2:
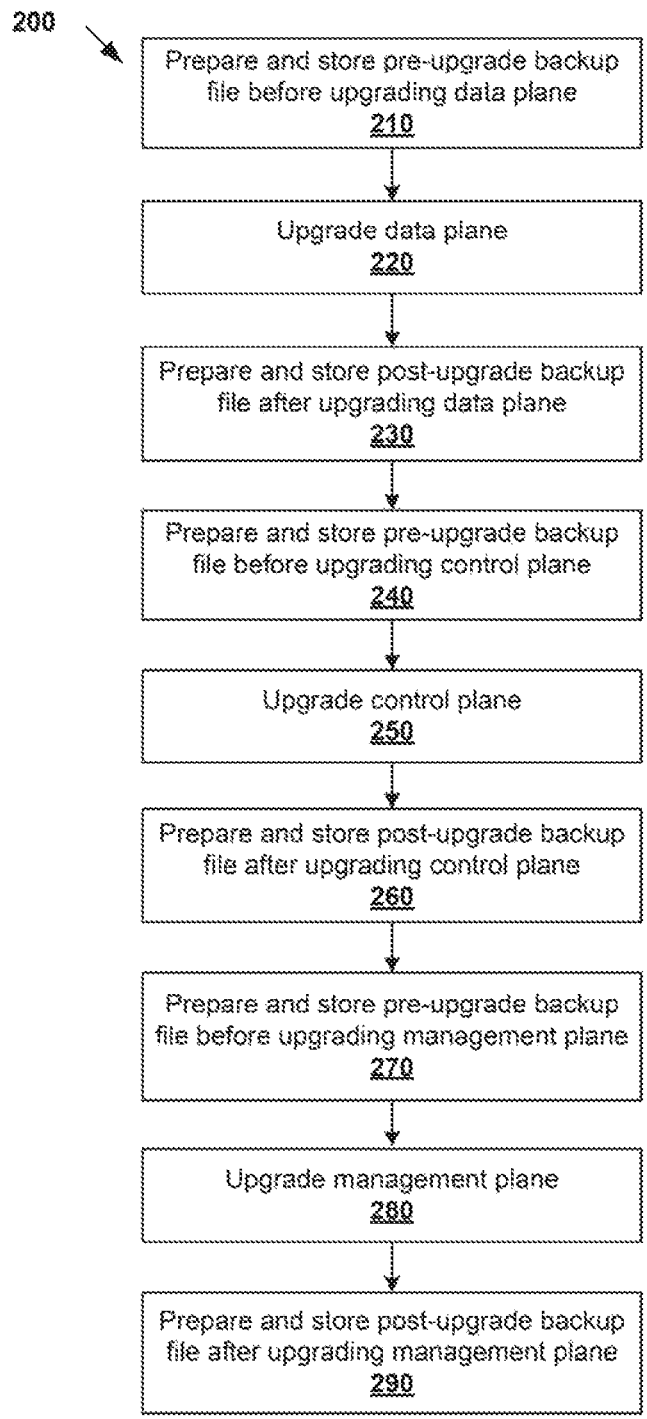
FIG. 2 is a flowchart of an example process of a management node to perform backup for validating the integrity of data and one or more configurations in a virtualized computing environment.

FIG. 2 is a flowchart of an example process 200 of a management node to perform backup for validating the integrity of data and one or more configurations in a virtualized computing environment. Example process 200 may include one or more operations, functions, or actions illustrated by one or more blocks, such as 210 to 290.

The various blocks may be combined into fewer blocks, divided into additional blocks, and/or eliminated depending on the desired implementation. In practice, example process 200 may be performed by a management node in a virtualized computing environment. One example management node may correspond to manager 151 in FIG. 1.

At 210 in FIG. 2, in conjunction with FIG. 1, upgrade coordinator 152 of manager 151 is configured to prepare pre-upgrade backup files associated with managers 151/153, controllers 161/163, edges 171/173 and hosts 110A/110B before upgrading data plane (i.e., hosts 110A/110B and edges 171/173) of virtualized computing environment 100. In some embodiments, the pre-upgrade backup files may be associated with three different categories.

In some embodiments, the first category includes a cluster-level backup file. The cluster-level backup file is configured to store information of the management plane cluster. In some embodiments, the cluster-level backup file includes state information of the management plane cluster (e.g., Corfu database). In some other embodiments, the cluster-level backup file may further includes cluster membership of one or more nodes in a network virtualization system (e.g., NSX) and one or more software versions.

In some embodiments, the second category includes one or more node-level backup files. The node-level backup files include a communication channel detail (e.g., Rabbit configuration including server certificate and/or private key), an appliance management state (e.g., whether a particular service is configured to run at boot time), a system log configuration, a verbosity level, a security certificate, a thumbprint of another component in the network virtualization system.

In some embodiments, the third category includes an inventory backup file. The inventory backup file is configured to store one or more logical entities added, updated and/or deleted in the network virtualization system. More specifically, the inventory backup file may include information associated with a fabric node, a fabric edge node, a logical switch, a logical router, a transport zone, a transport node, and/or a host switch profile of the network virtualization system. The inventory backup file may also maintain the data specific to a node, such as IP address, type of operation system, version of operation system, identification code, parent node, version, fully qualified domain name, display name, create time and user.

In addition to preparing the cluster-level backup file, the node-level backup files and the inventory backup file, at 210 in FIG. 2, upgrade coordinator 152 of manager 151 is configured to store the cluster-level backup file, the node-level backup files and the inventory backup file in backup server 190.

At 220 in FIG. 2, in conjunction with FIG. 1, upgrade coordinator 152 of manager 151 is configured to prepare upgrade plan 157 to upgrade all components in virtualized computing environment 100. Upgrade coordinator 152 may specify the tasks and the orders to carry out the tasks in upgrade plan 157. For example, upgrade plan 157 may include a first set of tasks to upgrade hosts 110A/110B, a second set of tasks to upgrade edges 171/173, a third set of tasks to upgrade controllers 161/163 and a fourth set of tasks to upgrade managers 151/153. In some embodiments, upgrade plan 157 may include an order of carrying out the first set of tasks, the second set of tasks, the third set of tasks and the fourth set of tasks in sequence. Upgrade coordinator 152 is configured to orchestrate the upgrade process of the data plane (i.e., hosts 110A/110B, edges 171/173) of virtualized computing environment 100.

At 230 in FIG. 2, in conjunction with FIG. 1, after upgrading the data plane of virtualized computing environment 100, upgrade coordinator 152 of manager 151 is configured to prepare post-upgrade backup files associated with managers 151/153, controllers 161/163, edges 171/173 and hosts 110A/110B. In some embodiments, the post-upgrade backup files may also be associated with the three categories as set forth above, except the cluster-level backup file, the node-level backup files and the inventory backup file of the post-upgrade backup files are prepared after upgrading the data plane and associated with information of virtualized computing environment 100 after edges 171/173 and hosts 110A/110B are upgraded.

At 240 in FIG. 2, in conjunction with FIG. 1, upgrade coordinator 152 of manager 151 is configured to prepare pre-upgrade backup files associated with managers 151/153, controllers 161/163, edges 171/173 and hosts 110A/110B before upgrading control plane (i.e., controllers 161/163) of virtualized computing environment 100. In some embodiments, the pre-upgrade backup files may also be associated with three different categories as set forth above, except the cluster-level backup file, the node-level backup files and the inventory backup file of the pre-upgrade backup files at 240 are prepared after upgrading the data plane but before upgrading the control plane, and associated with information of virtualized computing environment 100 after edges 171/ 173 and hosts 110A/110B are upgraded and before controllers 161/163 are upgraded.

At 250 in FIG. 2, in conjunction with FIG. 1, upgrade coordinator 152 is configured to orchestrate the upgrade process of the control plane (i.e., controllers 161/163) of virtualized computing environment 100 according to upgrade plan 157.

At 260 in FIG. 2, in conjunction with FIG. 1, after upgrading the control plane of virtualized computing environment 100, upgrade coordinator 152 of manager 151 is configured to prepare post-upgrade backup files associated with managers 151/153, controllers 161/163, edges 171/173 and hosts 110A/110B. In some embodiments, the post-upgrade backup files may also be associated with the three categories as set forth above, except the cluster-level backup file, the node-level backup files and the inventory backup file of the post-upgrade backup files at 260 are prepared after upgrading the control plane and associated with information of virtualized computing environment 100 after controllers 161/163 are upgraded.

At 270 in FIG. 2, in conjunction with FIG. 1, upgrade coordinator 152 of manager 151 is configured to prepare pre-upgrade backup files associated with managers 151/153, controllers 161/163, edges 171/173 and hosts 110A/110B before upgrading management plane (i.e., managers 151/153) of virtualized computing environment 100. In some embodiments, the pre-upgrade backup files may also be associated with three different categories as set forth above, except the cluster-level backup file, the node-level backup files and the inventory backup file of the pre-upgrade backup files at 270 are prepared after upgrading the control plane but before upgrading the management plane, and associated with information of virtualized computing environment 100 after controllers 161/163 are upgraded and before managers 151/153 are upgraded.

At 280 in FIG. 2, in conjunction with FIG. 1, upgrade coordinator 152 is configured to orchestrate the upgrade process of the management plane (i.e., managers 151/153) of virtualized computing environment 100 according to upgrade plan 157.

At 290 in FIG. 2, in conjunction with FIG. 1, after upgrading the management plane of virtualized computing environment 100, upgrade coordinator 152 of manager 151 is configured to prepare post-upgrade backup files associated with managers 151/153, controllers 161/163, edges 171/173 and hosts 110A/110B. In some embodiments, the post-upgrade backup files may also be associated with the three categories as set forth above, except the cluster-level backup file, the node-level backup files and the inventory backup file of the post-upgrade backup files at 290 are prepared after upgrading the management plane and associated with information of virtualized computing environment 100 after managers 151/153 are upgraded.

Figure 3:
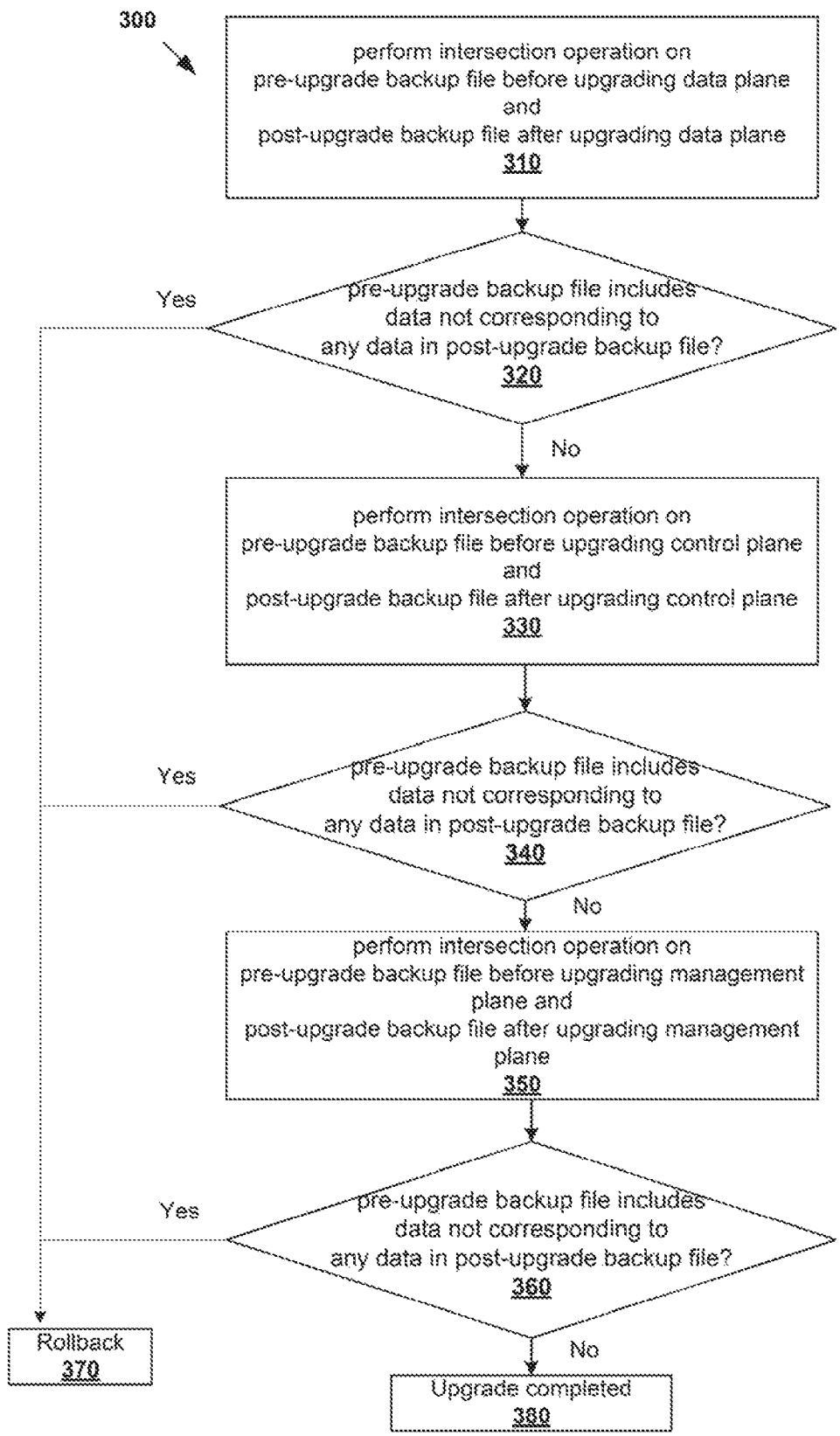
FIG. 3 is a flowchart of an example process of a management node to validate the integrity of data and one or more configurations after upgrading one or more nodes in a virtualized computing environment, all arranged in accordance with some embodiments of the disclosure.

FIG. 3 is a flowchart of an example process 300 of a management node to validate the integrity of data and one or more configurations after upgrading one or more nodes in a virtualized computing environment. In some embodiments, in conjunction with FIG. 1, one example management node may correspond to manager 151 in FIG. 1, and the one or more nodes may correspond to any of managers 151/153, controllers 161/163, edges 171/173 and hosts 110A/110B in virtualized computing environment 100.

At 310 in FIG. 3, in conjunction with FIG. 2, pre-upgrade backup file in 310 may correspond to pre-upgrade backup file in 210, and post-upgrade backup in 310 may correspond to post-upgrade backup file 230. At 310 in FIG. 3, an intersection operation is performed on pre-upgrade backup files in 210 and post-upgrade backup files in 230.

At 320 in FIG. 3, in response to any data in pre-upgrade backup file in 210 not corresponding to any data of post-upgrade back file in 230, suggesting that the non-corresponding data is missed or removed after upgrading the data plane, process 300 may pause proceeding to upgrade the control plane and go to 370 instead to perform a rollback operation to restore virtualized computing environment 100 back to a point before upgrading the data plane (e.g., before 220 in FIG. 2). In some embodiments, the rollback operation in 370 for data plane is based on pre-upgrade backup file prepared and stored in 210 in FIG. 2. In some other embodiments, the rollback operation is performed in response to an input on a user interface provided by the management node (e.g., manager 151).

In some embodiments, at 320 in FIG. 3, other than any data in pre-upgrade backup file in 210 not corresponding to any data of post-upgrade back file in 230, process 300 may go to 330. For example, in response to all data in pre-upgrade backup file in 210 corresponding to all data of post-upgrade back file in 230, suggesting data and configuration remain integrity after upgrading the data plane, process 300 may go to 330. In some other embodiments, in response to any data in post-upgrade backup file in 230 not corresponding to any data of pre-upgrade back file in 210, suggesting new data/features are added after upgrading the data plane, process 300 may also go to 330. In some embodiments, in conjunction with FIGS. 2, 310 and 320 in FIG. 3 may be performed after 230 but before 240 in FIG. 2.

At 330 in FIG. 3, in conjunction with FIG. 2, pre-upgrade backup file in 330 may correspond to pre-upgrade backup file in 240, and post-upgrade backup in 330 may correspond to post-upgrade backup file 260. At 330 in FIG. 3, an intersection operation is performed on pre-upgrade backup files in 240 and post-upgrade backup files in 260.

At 340 in FIG. 3, in response to any data in pre-upgrade backup file in 240 not corresponding to any data of post-upgrade back file in 260, suggesting that the non-corresponding data is removed after upgrading the control plane, process 300 may pause proceeding to upgrade the management plane and go to 370 instead to perform a rollback operation to restore virtualized computing environment 100 back to a point before upgrading control plane (e.g., before 250 in FIG. 2) or to a point before upgrading the data plane (e.g., before 220 in FIG. 2). In some embodiments, the rollback operation in 370 is based on pre-upgrade backup file prepared and stored in 240 in FIG. 2 to restore virtualized computing environment 100 back to the point before upgrading the control plane or is based on pre-upgrade backup file prepared and stored in 210 in FIG. 2 to restore virtualized computing environment 100 back to the point before upgrading the data plane. In some other embodiments, the rollback operation is performed in response to an input on a user interface provided by the management node (e.g., manager 151).

In some embodiments, at 340 in FIG. 3, other than any data in pre-upgrade backup file in 240 not corresponding to any data of post-upgrade back file in 260, process 300 may go to 350. For example, in response to all data in pre-upgrade backup file in 240 corresponding to all data of post-upgrade back file in 260, suggesting that the integrity of data and configuration is maintained after upgrading the control plane, process 300 may go to 350. In some other embodiments, in response to any data in post-upgrade backup file in 260 not corresponding to any data of pre-upgrade back file in 240, suggesting that new data/features are added after upgrading the data plane, process 300 may also go to 350. In some embodiments, in conjunction with FIGS. 2, 330 and 340 in FIG. 3 may be performed after 260 but before 270 in FIG. 2.

At 350 in FIG. 3, in conjunction with FIG. 2, pre-upgrade backup file in 350 may correspond to pre-upgrade backup file in 270, and post-upgrade backup in 350 may correspond to post-upgrade backup file 290. At 350 in FIG. 3, an intersection operation is performed on pre-upgrade backup files in 270 and post-upgrade backup files in 290.

At 360 in FIG. 3, in response to any data in pre-upgrade backup file in 270 not corresponding to any data of post-upgrade back file in 290, suggesting that the non-corresponding data is removed after upgrading the management plane, process 300 may go to 370 to perform a rollback operation to restore virtualized computing environment 100 back to a point before upgrading the management plane (e.g., before 280 in FIG. 2), to a point before upgrading the control plane (e.g., before 250 in FIG. 2) or to a point before upgrading the data plane (e.g., before 220 in FIG. 2). In some embodiments, the rollback operation in 370 is based on pre-upgrade backup file prepared and stored in 270 in FIG. 2 to restore virtualized computing environment 100 back to the point before upgrading management plane. In some embodiments, the rollback operation in 370 is based on pre-upgrade backup file prepared and stored in 240 in FIG. 2 to restore virtualized computing environment 100 back to the point before upgrading control plane. In some embodiments, the rollback operation in 370 is based on pre-upgrade backup file prepared and stored in 210 in FIG. 2 to restore virtualized computing environment 100 back to the point before upgrading data plane. In some other embodiments, the rollback operation is performed in response to an input on a user interface provided by the management node (e.g., manager 151).

In some embodiments, at 360 in FIG. 3, other than any data in pre-upgrade backup file in 270 not corresponding to any data of post-upgrade back file in 290, process 300 may go to 350. For example, in response to all data in pre-upgrade backup file in 270 corresponding to all data of post-upgrade back file in 290, suggesting data and configuration remain integrity after upgrading the management plane, process 300 may go to 380. In some other embodiments, in response to any data in post-upgrade backup file in 290 not corresponding to any data of pre-upgrade back file in 270, suggesting new data/features are added after upgrading the management plane, process 300 may also go to 350. In some embodiments, in conjunction with FIGS. 2, 350 and 360 in FIG. 3 may be performed after 290 in FIG. 2.

At 380 in FIG. 3, process 300 is configured to determine upgrade is successful and data and configurations remain integrity during the upgrade.

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 3. For example, the computer system may implement processes performed by managers 151/153, controllers 161/163, edges 171/173 and hosts 110A/110B, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method to validate integrity of data and one or more configurations in response to an upgrade in a virtualized computing environment, wherein the method comprises:
   preparing a first pre-upgrade backup file and a first post-upgrade backup file in response to a data plane upgrade of the virtualized computing environment;
   validating the integrity of data and one or more configurations based on the first pre-upgrade backup file and the first post-upgrade backup file before upgrading a control plane of the virtualized computing environment;
   preparing a second pre-upgrade backup file and a second post-upgrade backup file in response to a control plane upgrade of the virtualized computing environment;
   validating the integrity of data and one or more configurations based on the second pre-upgrade backup file and the second post-upgrade backup file before upgrading a management plane of the virtualized computing environment;
   preparing a third pre-upgrade backup file and a third post-upgrade backup file in response to a management plane upgrade of the virtualized computing environment; and
   validating the integrity of data and one or more configurations based on the third pre-upgrade backup file and the third post-upgrade backup file after upgrading the management plane of the virtualized computing environment.

2. The method of claim 1, further comprising storing the first pre-upgrade backup file, the first post-upgrade backup file, the second pre-upgrade backup file, the second post-upgrade backup file, the third pre-upgrade backup file, and the third post-upgrade backup file in a physical backup server other than any node of the virtualized computing environment.

3. The method of claim 1, in response to any data included in the first pre-upgrade backup file not corresponding to any data in the first post-upgrade backup file, further comprising determining that data is missed in response to the data plane upgrade and pausing to proceed the control plane upgrade.

4. The method of claim 3, further comprising performing a first rollback operation to restore the virtualized computing environment back to a point before upgrading the data plane based on the first pre-upgrade backup file.

5. The method of claim 4, wherein the rollback operation is in response to an input on a user interface of the virtualized computing environment.

6. The method of claim 1, in response to any data included in the first pre-upgrade backup file corresponding to any data in the first post-upgrade backup file, further comprising proceeding to the control plane upgrade.

7. The method of claim 1, in response to any data included in the first post-upgrade backup file not corresponding to any data in the first pre-upgrade backup file, further comprising determining that a new element is added in response to the data plane upgrade and proceeding to the control plane upgrade.

8. The method of claim 1, in response to any data included in the second pre-upgrade backup file not corresponding to any data in the second post-upgrade backup file, further comprising determining that data is missed in response to the control plane upgrade, pausing to proceed the management plane upgrade, and performing a second rollback operation to restore the virtualized computing environment back to a point before upgrading the control plane based on the second pre-upgrade backup file or to a point before upgrading the data plane based on the first pre-upgrade backup file.

9. The method of claim 1, in response to any data included in the third pre-upgrade backup file not corresponding to any data in the third post-upgrade backup file, further comprising determining that data is missed in response to the management plane upgrade and performing a third rollback operation to restore the virtualized computing environment back to a point before upgrading the management plane based on the third pre-upgrade backup file, to a point before upgrading the control plane based on the second pre-upgrade backup file, or to a point before upgrading the data plane based on the first pre-upgrade backup file.

10. A computer system configured to validate integrity of data and one or more configurations in response to an upgrade in a virtualized computing environment, wherein the computer system comprises:
 a processor; and
 a non-transitory computer-readable medium having stored thereon instructions that, in response to execution by the processor, cause the processor to:
 prepare a first pre-upgrade backup file and a first post-upgrade backup file in response to a data plane upgrade of the virtualized computing environment;
 validate the integrity of data and one or more configurations based on the first pre-upgrade backup file and the first post-upgrade backup file before upgrading a control plane of the virtualized computing environment;
 prepare a second pre-upgrade backup file and a second post-upgrade backup file in response to a control plane upgrade of the virtualized computing environment;
 validate the integrity of data and one or more configurations based on the second pre-upgrade backup file and the second post-upgrade backup file before upgrading a management plane of the virtualized computing environment;
 prepare a third pre-upgrade backup file and a third post-upgrade backup file in response to a management plane upgrade of the virtualized computing environment; and
 validate the integrity of data and one or more configurations based on the third pre-upgrade backup file and the third post-upgrade backup file after upgrading the management plane of the virtualized computing environment.

11. The computer system of claim 10, wherein the non-transitory computer-readable medium having stored thereon additional instructions that, when executed by the processor, cause the processor to store the first pre-upgrade backup file, the first post-upgrade backup file, the second pre-upgrade backup file, the second post-upgrade backup file, the third pre-upgrade backup file, and the third post-upgrade backup file in a physical backup server other than any node of the virtualized computing environment.

12. The computer system of claim 10, wherein the non-transitory computer-readable medium having stored thereon additional instructions that, when executed by the processor, cause the processor to, in response to any data included in the first pre-upgrade backup file not corresponding to any data in the first post-upgrade backup file, determine that data is missed in response to the data plane upgrade, pause to proceed the control plane upgrade, and perform a first rollback operation to restore the virtualized computing environment back to a point before upgrading the data plane based on the first pre-upgrade backup file.

13. The computer system of claim 12, wherein the non-transitory computer-readable medium having stored thereon additional instructions that, when executed by the processor, cause the processor to receive an input on a user interface of another computer system.

14. The computer system of claim 10, wherein the non-transitory computer-readable medium having stored thereon additional instructions that, when executed by the processor, cause the processor to, in response to any data included in the first pre-upgrade backup file corresponding to any data in the first post-upgrade backup file, proceed to the control plane upgrade.

15. The computer system of claim 10, wherein the non-transitory computer-readable medium having stored thereon additional instructions that, when executed by the processor, cause the processor to, in response to any data included in the first post-upgrade backup file not corresponding to any data in the first pre-upgrade backup file, determining that a new element is added in response to the data plane upgrade and proceed to the control plane upgrade.

16. The computer system of claim 10, wherein the non-transitory computer-readable medium having stored thereon additional instructions that, when executed by the processor, cause the processor to, in response to any data included in the second pre-upgrade backup file not corresponding to any data in the second post-upgrade backup file, determine that data is missed in response to the control plane upgrade, pause to proceed the management plane upgrade, and perform a second rollback operation to restore the virtualized computing environment back to a point before upgrading the control plane based on the second pre-upgrade backup file or to a point before upgrading the data plane based on the first pre-upgrade backup file.

17. The computer system of claim 10, wherein the non-transitory computer-readable medium having stored thereon additional instructions that, when executed by the processor, cause the processor to, in response to any data included in the third pre-upgrade backup file not corresponding to any data in the third post-upgrade backup file, determine that data is missed in response to the management plane upgrade and perform a third rollback operation to restore the virtualized computing environment back to a point before upgrading the management plane based on the third pre-upgrade backup file, to a point before upgrading the control plane based on the second pre-upgrade backup file, or to a point before upgrading the data plane based on the first pre-upgrade backup file.

18. A non-transitory computer-readable storage medium that includes a set of instructions which, in response to execution by a processor of a computer system, cause the processor to implement a method of validating integrity of data and one or more configurations in response to an upgrade in a virtualized computing environment, wherein the method comprises:
preparing a first pre-upgrade backup file and a first post-upgrade backup file in response to a data plane upgrade of the virtualized computing environment;
validating the integrity of data and one or more configurations based on the first pre-upgrade backup file and the first post-upgrade backup file before upgrading a control plane of the virtualized computing environment;
preparing a second pre-upgrade backup file and a second post-upgrade backup file in response to a control plane upgrade of the virtualized computing environment;
validating the integrity of data and one or more configurations based on the second pre-upgrade backup file and the second post-upgrade backup file before upgrading a management plane of the virtualized computing environment;
preparing a third pre-upgrade backup file and a third post-upgrade backup file in response to a management plane upgrade of the virtualized computing environment; and
validating the integrity of data and one or more configurations based on the third pre-upgrade backup file and the third post-upgrade backup file after upgrading the management plane of the virtualized computing environment.

19. The non-transitory computer-readable storage medium of claim 18, wherein the method further comprises, in response to any data included in the first pre-upgrade backup file not corresponding to any data in the first post-upgrade backup file, determining that data is missed in response to the data plane upgrade, pausing to proceed the control plane upgrade, and performing a first rollback operation to restore the virtualized computing environment back to a point before upgrading the data plane based on the first pre-upgrade backup file.

20. The non-transitory computer-readable storage medium of claim 18, wherein the method further comprises, in response to any data included in the second pre-upgrade backup file not corresponding to any data in the second post-upgrade backup file, determining that data is missed in response to the control plane upgrade, pausing to proceed the management plane upgrade, and performing a second rollback operation to restore the virtualized computing environment back to a point before upgrading the control plane based on the second pre-upgrade backup file or to a point before upgrading the data plane based on the first pre-upgrade backup file.

21. The non-transitory computer-readable storage medium of claim 18, wherein the method further comprises, in response to any data included in the third pre-upgrade backup file not corresponding to any data in the third post-upgrade backup file, determining that data is missed in response to the management plane upgrade and performing a third rollback operation to restore the virtualized computing environment back to a point before upgrading the management plane based on the third pre-upgrade backup file, to a point before upgrading the control plane based on the second pre-upgrade backup file, or to a point before upgrading the data plane based on the first pre-upgrade backup file.

* * * * *